United States Patent
Yamaguchi et al.

(10) Patent No.: US 11,606,044 B2
(45) Date of Patent: Mar. 14, 2023

(54) POWER CONVERSION DEVICE

(71) Applicant: KEIHIN CORPORATION, Tokyo (JP)

(72) Inventors: Nobukatsu Yamaguchi, Sakura (JP);
Yuta Nakamura, Utsunomiya (JP);
Yasuhiko Kondo, Wako (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 162 days.

(21) Appl. No.: 17/038,671

(22) Filed: Sep. 30, 2020

(65) Prior Publication Data
US 2021/0104955 A1 Apr. 8, 2021

(30) Foreign Application Priority Data
Oct. 2, 2019 (JP) .............................. JP2019-181835

(51) Int. Cl.
*B60L 3/00* (2019.01)
*H02M 7/515* (2007.01)
(52) U.S. Cl.
CPC ........... *H02M 7/515* (2013.01); *B60L 3/0015* (2013.01); *B60L 2210/40* (2013.01)
(58) Field of Classification Search
USPC .................................................. 307/9.1, 10.1
See application file for complete search history.

(56) References Cited

U.S. PATENT DOCUMENTS

| | | | |
|---|---|---|---|
| 10,625,622 B2* | 4/2020 | Bando | B60L 58/20 |
| 2014/0022681 A1* | 1/2014 | Mitsutani | B60L 15/007 |
| | | | 361/86 |
| 2020/0189395 A1* | 6/2020 | Takahashi | B60L 3/0061 |

FOREIGN PATENT DOCUMENTS

JP  2018019536 A  2/2018

\* cited by examiner

*Primary Examiner* — Rexford N Barnie
*Assistant Examiner* — Xuan Ly
(74) *Attorney, Agent, or Firm* — Cantor Colburn LLP (57) ABSTRACT

The present power conversion device includes an inverter, a step-up/down converter, a first capacitor, a second capacitor, a voltage sensor, a control device, and a backup power supply. The auxiliary device is connected between the first DC power supply and the step-up/down converter, and the control device includes an abnormality determination unit configured to determine that an abnormality has occurred when a control voltage is equal to or lower than a first threshold value, and a control unit configured to execute discharge control when the abnormality determination unit determines that the abnormality has occurred and an inter-terminal voltage measured by the voltage sensor is equal to or lower than a second threshold value.

6 Claims, 4 Drawing Sheets

POWER CONVERSION DEVICE

CROSS REFERENCE TO RELATED APPLICATIONS

The present invention claims priority under 35 U.S.C. § 119 to Japanese Patent Application No. 2019-181835, filed Oct. 2, 2019, the entire content of which is incorporated herein by reference.

BACKGROUND OF THE INVENTION

Field of the Invention

The present invention relates to a power conversion device.

Description of Related Art

There is a power conversion device that is mounted in a vehicle, converts DC power from a battery into AC power to supply the AC power to a motor generator, and converts AC power generated by the motor generator into DC power to supply the DC power to the battery. An example of a conventional power conversion device is disclosed in Japanese Unexamined Patent Application, First Publication No. 2018-19536.

A conventional power conversion device includes a step-up/down converter, a first capacitor, a second capacitor, and a motor ECU. The step-up/down converter performs a step-up operation in which power from a battery is stepped up and supplied to an inverter for motor driving and a step-down operation in which power from the inverter is stepped down and supplied to the battery. The first capacitor is a smoothing capacitor which is provided between the battery and the step-up/down converter. The second capacitor is a smoothing capacitor which is provided between the step-up/down converter and the inverter. The motor electronic control unit (ECU) communicates with an external electronic control unit (ECU) (battery electronic control unit (ECU), a hybrid electronic control unit (HVECU), or the like) using the power from the control power supply as operation power. Then, the motor ECU controls the step-up/down converter such that discharge control for rapidly discharging residual charge of the second capacitor is executed when a discharge instruction signal is received from the external ECU.

Incidentally, when a collision of a vehicle has occurred, it is necessary to disconnect the power conversion device from the battery and rapidly consume the residual charge of the first capacitor and the second capacitor. However, a power supply line for supplying power from the control power supply to the motor ECU may be disconnected in some cases according to a state of the vehicle due to the collision.

Therefore, the motor ECU described above executes the discharge control by using power of the first capacitor as an operation power when a collision of a vehicle has occurred.

SUMMARY OF THE INVENTION

Here, when an auxiliary device is connected between the battery and the step-up/down converter, an electric charge of the first capacitor is consumed by the auxiliary device at a time of the collision. Therefore, power (operation power) from the first capacitor to the motor ECU may disappear before the motor ECU communicates with an external ECU and receives a discharge instruction signal. For this reason, in a power conversion device, when the auxiliary device is connected between the battery and the step-up/down converter, it may be difficult to execute discharge control of the second capacitor.

The present invention has been made in view of such circumstances, and an object thereof is to provide a power conversion device capable of executing discharge control of a smoothing capacitor (a second capacitor) when an auxiliary device is connected between a battery and a step-up/down converter.

The present invention has adopted the following aspects to solve the problems described above and achieve the object.

(1) According to one aspect of the present invention, a power conversion device of a vehicle that includes an electric motor, a first DC power supply, a second DC power supply, and an auxiliary device includes an inverter configured to drive the electric motor, a step-up/down converter configured to perform a step-up operation of stepping up power from the first DC power supply to supply the power to the inverter, and a step-down operation of stepping down power from the inverter to supply the power to the first DC power supply, a first capacitor that is provided between the first DC power supply and the step-up/down converter, a second capacitor that is provided between the step-up/down converter and the inverter, a voltage sensor configured to measure an inter-terminal voltage of the first capacitor, a control device configured to execute discharge control for discharging residual charge of the second capacitor using a control voltage supplied from the second DC power supply as an operation source, and a backup power supply configured to supply power stored in the first capacitor to the control device, in which the auxiliary device is connected between the first DC power supply and the step-up/down converter, and the control device includes an abnormality determination unit configured to determine that an abnormality has occurred when the control voltage is equal to or lower than a first threshold value, and a control unit configured to execute the discharge control when the abnormality determination unit determines that an abnormality has occurred and the inter-terminal voltage measured by the voltage sensor is equal to or lower than a second threshold value.

(2) In the power conversion device of (1) described above, the control unit may be configured to stop the discharge control when the control voltage has been higher than the first threshold value for a predetermined time during the discharge control.

(3) The power conversion device of (2) described above may be configured as follows: the step-up/down converter includes an upper arm and a lower arm that are switching elements, and a reactor that has a first end and a second end, in which the first end is connected to a first capacitor and the second end is connected between the upper arm and the lower arm, in which the control unit is configured to fix the lower arm in an off state and control switching of the upper arm at a predetermined duty ratio as the discharge control.

(4) The power conversion device of any one of (1) to (3) described above may be configured as follows: the power conversion device further includes a collision detection device configured to detect a collision of the vehicle and output a collision detection signal to the control unit, in which the control unit is configured to execute the discharge control when the collision detection signal is received.

According to each aspect of the present invention described above, when an auxiliary device is connected between a battery and a step-up/down converter, it is possible to execute the discharge control of the smoothing capacitor (the second capacitor).

DETAILED DESCRIPTION OF THE INVENTION

Figure 1:
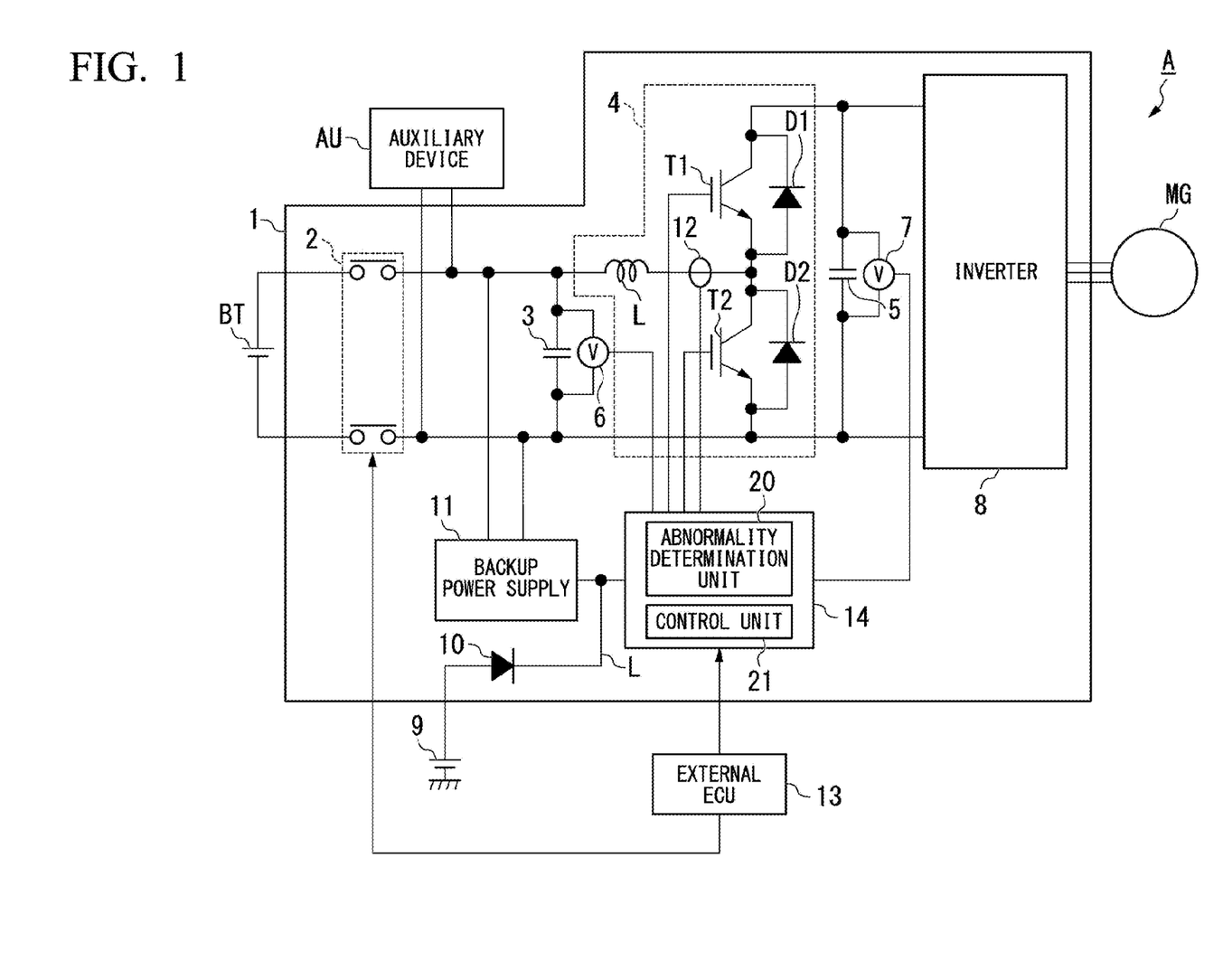
FIG. 1 is a block diagram which shows a configuration of a vehicle A that includes a power conversion device according to an embodiment of the present invention.

Hereinafter, a power conversion device according to one embodiment of the present invention will be described using the drawings. FIG. 1 is a block diagram which shows a configuration of a vehicle A that includes a power conversion device according to the present embodiment. Note that the vehicle A shown in FIG. 1 is a hybrid vehicle or an electric vehicle.

As shown in FIG. 1, the vehicle A includes a battery BT, an auxiliary device AU, a motor generator MG, and a power conversion device 1.

The battery BT is a rechargeable secondary battery such as a lithium-ion battery. The battery BT is an example of a "first DC power supply" of the present invention.

An auxiliary device AU is, for example, an air conditioner, a power steering device, a light projection device, or the like.

The motor generator MG is an AC rotating electric machine. For example, the motor generator MG is used as a generator driven by an engine of the vehicle A and is also used as an electric motor for starting the engine. The motor generator mainly operates as an electric motor and drives wheels (not shown) of the vehicle A. On the other hand, when the vehicle A is being braked or the acceleration on a downward slope is being reduced, the motor generator MG operates as a generator and regenerates generated power (hereinafter, referred to as "regenerative power") to the power conversion device 1.

The power conversion device 1 converts DC power from the battery BT into AC power and supplies the AC power to a motor generator MG. In addition, the power conversion device 1 also converts regenerative power, which is AC power generated by the motor generator MG, into DC power, and supplies the DC power to the battery BT.

When a collision of the vehicle A has occurred, the power conversion device 1 executes discharge control for discharging residual charge of a smoothing capacitor (a second capacitor 5 to be described below) provided in the power conversion device 1.

In the following description, a schematic configuration of the power conversion device 1 according to the present embodiment will be described.

The power conversion device 1 according to the present embodiment includes a contactor 2, a first capacitor 3, a step-up/down converter 4, a second capacitor 5, a first voltage sensor 6, a second voltage sensor 7, an inverter 8, a control power supply 9, a diode 10, a backup power supply 11, a current sensor 12, and a motor electronic control unit (ECU) 14. Note that the motor ECU 14 is an example of a "control device" of the present invention.

The contactor 2 connects the battery BT and the step-up/down converter 4 or releases a connection between the battery BT and the step-up/down converter 4 under control of the battery ECU 13.

The first capacitor 3 is a smoothing capacitor provided on a primary side (a battery BT side) of the step-up/down converter 4. That is, the first capacitor 3 is provided between the battery BT and the step-up/down converter 4.

The step-up/down converter 4 includes a reactor L, switching elements T1 and T2 connected in series, and diodes D1 and D2 connected in parallel in a direction opposite to the switching elements T1 and T2.

The reactor L has a first end and a second end. The first end of the reactor L is connected to the contactor 2 and the first capacitor 3. The second end of the reactor L is connected between a switching element T1 (an upper arm) and a switching element T2 (a lower arm). Note that an insulated gate bipolar transistor (IGBT) or a field effective transistor (FET) can be used as the switching elements T1 and T2.

The step-up/down converter 4 performs a step-up operation in which the power from the battery BT is stepped up and supplied to the inverter 8 by the switching elements T1 and T2 being turned on or off under control of the motor ECU 14, or performs a step-down operation in which the power from the inverter 8 is stepped down and supplied to the battery BT.

Here, the auxiliary device AU is connected to the primary side of the step-up/down converter 4. That is, the auxiliary device AU is connected between the contactor 2 and a first end of the reactor L. As a result, the auxiliary device AU operates using the power stored in the first capacitor 3 as operation power when the contactor 2 is open (in an open state) and the connection between the battery BT and the step-up/down converter 4 is released.

The second capacitor 5 is a smoothing capacitor that is provided on the secondary side (the inverter 8 side) of the step-up/down converter 4. That is, the second capacitor 5 is provided between the step-up/down converter 4 and the inverter 8.

The first voltage sensor 6 is a sensor that is attached between both terminals of the first capacitor 3, and measures a voltage value Vc1 between both terminals of the first capacitor 3 (hereinafter, referred to as an "inter-terminal voltage value Vc1"). The first voltage sensor 6 outputs the measured inter-terminal voltage value Vc1 to the motor The second voltage sensor 7 is a sensor that is attached between both terminals of the second capacitor 5, and measures a voltage value Vc2 between both terminals of the second capacitor 5 (hereinafter, referred to as an "inter-terminal voltage value Vc2"). The second voltage sensor 7 outputs the measured inter-terminal voltage value Vc2 to the motor ECU 14.

The inverter 8 rotationally drives the motor generator MG of the vehicle A. The inverter 8 converts DC power supplied from the step-up/down converter 4 into AC power and supplies the AC power to the motor generator MG. In addition, the inverter 8 converts regenerative power regenerated from the motor generator MG into DC power and supplies the DC power to the step-up/down converter 4. Note that the inverter 8 may be controlled by the motor ECU 14.

The control power supply 9 is a DC power supply that supplies power to the motor ECU 14 via a power supply line L. Specifically, the control power supply 9 is a power supply of the motor ECU 14, and supplies a control voltage that is an operation source of the motor ECU 14 to the motor ECU 14. Note that a secondary battery such as a nickel hydrogen battery or a lithium ion battery can be used as the control power supply 9. In addition, an electric double layer capacitor can be used as the control power supply 9 instead of the secondary battery. Here, the control power supply 9 is an example of a "second DC power supply."

The diode 10 has an anode connected to a positive terminal of the control power supply 9 and a cathode connected to the motor ECU 14. This diode 10 is a diode for preventing a backflow.

The backup power supply 11 is a backup power supply of the control power supply 9. The backup power supply 11 generates a backup voltage Va that is a voltage at which the motor ECU 14 can operate and supplies the backup voltage Va to the motor ECU 14 using power stored in the first capacitor 3. For example, the backup power supply 11 supplies the power stored in the first capacitor 3 as an operation power of the motor ECU 14. For example, the backup power supply 11 may include a DCDC converter. Note that the backup power supply 11 constantly supplies the backup voltage Va to the motor ECU 14.

The current sensor 12 measures a current value IL flowing through a reactor L, and outputs the measured current value IL to the motor ECU 14.

The external ECU 13 performs charge/discharge control of the battery BT and control of the contactor 2. Specifically, when an abnormality of the vehicle A (for example, a battery abnormality, a collision of the vehicle A, or the like) has occurred, or when an ignition is turned off, the external ECU 13 controls the contactor 2 so as to release the connection between the battery BT and the step-up/down converter 4, and to output a discharge instruction signal to the motor ECU 14. For example, the external ECU 13 detects a collision of the vehicle A according to a collision detection device (for example, a supplemental restraint system) mounted in the vehicle A.

The motor ECU 14 controls a rotation of the motor generator MG by controlling driving of the step-up/down converter 4 and the inverter 8. The motor ECU 14 controls a step-up operation and a step-down operation of the step-up/down converter 4 by controlling switching of each of the switching elements T1 and T2 of the step-up/down converter 4. In addition, the motor ECU 14 starts discharge control for rapidly discharging electric charges stored in the second capacitor 5 before receiving a discharge instruction signal output from the external ECU 13 when the collision of the vehicle A has occurred. Further, the power supplies of the ECU 14 are the control power supply 9 and the backup power supply 11.

The motor ECU 14 may be configured by a microprocessor such as a central processing unit (CPU) or a micro-processing unit (MPU), a micro controller such as a memory control unit (MCU), or the like.

In the following description, the motor ECU 14 according to the present embodiment will be described in detail.

The motor ECU 14 includes an abnormality determination unit 20 and a control unit 21.

The abnormality determination unit 20 executes abnormality determination processing for determining whether a voltage value of a control voltage supplied from the control power supply 9 via the power supply line L (hereinafter, referred to as a "control voltage value") Vr is equal to or lower than a predetermined voltage value (hereinafter, referred to as "first threshold value") Vth1. Then, as a result, when the control voltage value Vr is equal to or lower than the first threshold value Vth, the abnormality determination unit 20 determines that an abnormality has occurred. "Abnormality" herein is, for example, a disconnection of the power supply line L or a failure of the control power supply 9. The abnormality determination unit 20 executes the abnormality determination processing for determining a presence or absence of an abnormality on the basis of the control voltage value Vr, and outputs an abnormality signal indicating an occurrence of an abnormality to the control unit 21 when it is determined that the abnormality has occurred. Note that the abnormality determination unit 20 executes an abnormality determination processing at certain intervals. Therefore, when the it is determined that the control voltage value Vr is not equal to or lower than the first threshold value Vth (when the control voltage value Vr has exceeded the first threshold value Vth) in the abnormality determination processing after the control voltage value Vr having been equal to or lower than the first threshold value Vth, the abnormality determination unit 20 may stop an output of an abnormality signal.

The control unit 21 executes the discharge control when it is determined by the abnormality determination unit 20 that an abnormality has occurred and a condition that the inter-terminal voltage value Vc1 detected by the first voltage sensor 6 is equal to or lower than a predetermined voltage value (hereinafter, referred to as a "second threshold value") Vth2 is satisfied. As a result, the control unit 21 can start the discharge control before a discharge instruction signal is received, and can execute the discharge control before the supply of power (operation power) to the motor ECU 14 is stopped. In the present embodiment, the control unit 21 determines that an abnormality has occurred when an abnormality signal is received from the abnormality determination unit 20. Note that the second threshold value Vth2 may be set to a value higher than the lower limit value Vd of the voltage at which the backup power supply 11 can operate. In addition, the second threshold value Vth2 may also be set to a value higher than the lower limit value Vd of an input voltage from which the backup power supply 11 can generate a control voltage from the input voltage.

For example, the control unit 21 controls the step-up/down converter 4, as the discharge control, such that the residual charge of the second capacitor 5 is discharged. For example, the control unit 21 controls the step-up/down converter 4, as the discharge control, to perform a step-down operation such that the residual charge of the second capacitor 5 is discharged. In this case, the control unit 21 may fix the switching element T2 to be in the off state, and control the switching of the switching element T1 at a predetermined duty ratio. As a result, the control unit 21 prevents the second capacitor 5 from stopping a step-down operation of the step-up/down converter 4 due to an overvoltage.

Note that the control unit 21 stops the discharge control when it is determined during the discharge control by the abnormality determination unit 20 that an abnormality is resolved (when it is determined to be normal). For example, the control unit 21 stops the discharge control when it is determined during the discharge control that the control voltage value Vr has exceeded the first threshold value Vth1.

Figure 2:
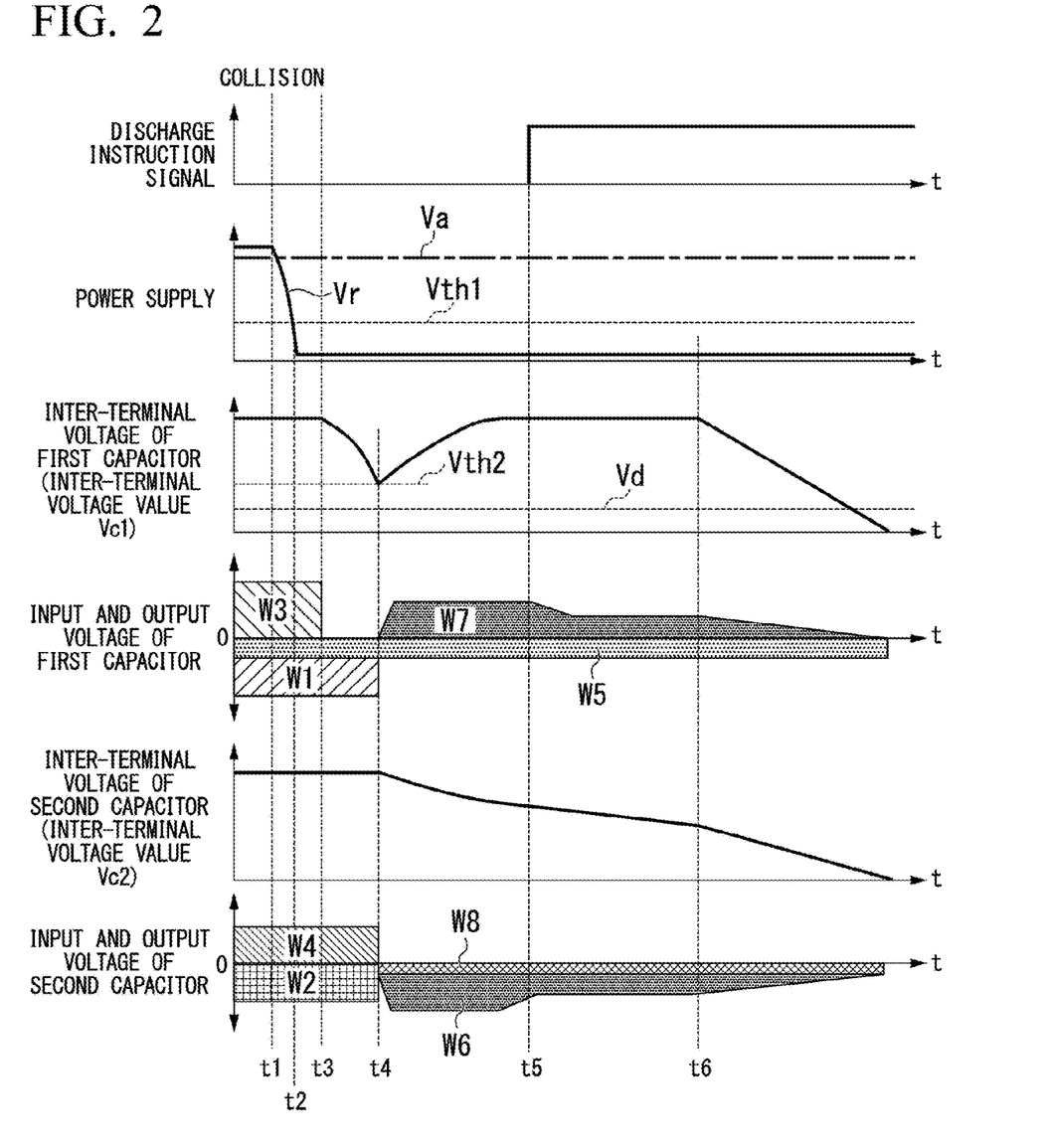
FIG. 2 is a timing chart of the power conversion device 1 according to the same embodiment.

Next, a flow of an operation of the power conversion device 1 according to the present embodiment will be described using FIG. 2. FIG. 2 is a timing chart of the power conversion device 1 according to the present embodiment.

As an initial condition, the power conversion device 1 acquires power from the battery BT via the contactor 2 in a closed state. Then, the step-up/down converter 4 rotationally drives the motor generator MG by stepping up a power W1 from the battery BT and supplying a stepped-up power W2 to the inverter 8. In this case, a power W3 is stored in the first capacitor 3 by the power from the battery BT. Furthermore, a power W4 is constantly stored in the second capacitor 5 by the power W2.

Here, as shown in FIG. 2, it is assumed that the collision of the vehicle A occurs at the time t1 and an abnormality has occurred on the power supply line L due to the collision. As a result, the control power supply value Vr gradually decreases from the time t1, falls below the first threshold value Vth1 at the time t2, and falls below a lower limit value of a voltage at which the motor ECU 14 can operate. Therefore, the abnormality determination unit 20 determines that the control voltage value Vr is equal to or lower than the first threshold value Vth1 by performing abnormality determination processing at the time 2, and outputs an abnormality signal to the controller 21.

If the collision of the vehicle A is detected, the external ECU 13 controls the contactor 2 such that it is in the open state at a time t3 that is a predetermined time after the collision, and releases the connection between the battery BT and the step-up/down converter 4. As a result, a supply of the power from the battery BT to the step-up/down converter 4 is stopped. Therefore, a power W5 is supplied from the first capacitor 3 to the auxiliary device AU and an inter-terminal voltage of the first capacitor 3 sharply decreases from the time t3.

At a time t4, the inter-terminal voltage of the first capacitor 3 is equal to or lower than the second threshold value Vth2. Therefore, the control unit 21 determines that the inter-terminal voltage value Vc1 has been equal to or lower than the second threshold value Vth2 at the time t4. Here, the control unit 21 acquires an abnormality signal from the abnormality determination unit 20 by the time t4. Therefore, the control unit 21 executes the discharge control when it is determined by the abnormality determination unit 20 that an abnormality has occurred at the time t4 and it is determined that a condition that the inter-terminal voltage value Vc1 detected by the first voltage sensor 6 is equal to or lower than the second threshold value Vth2 is satisfied. That is, for example, the control unit 21 fixes the switching element T2 to be in the off state at the time t4, controls the switching of the switching element T1 at a predetermined duty ratio such that the inter-terminal voltage value Vc1 is maintained at the target value Vm, and executes the discharge control by executing the step-down operation of the step-up/down converter 4. Therefore, a power W6 of the second capacitor 5 is stepped down, and a stepped-down power W7 starts to be charged in the first capacitor 3. Furthermore, a part of a power W8 stored in the second capacitor 5 is supplied to the inverter 8, and is discharged to the motor generator MG.

At the time t4, if the first capacitor 3 starts to be charged, the inter-terminal voltage of the first capacitor 3 rises, and the inter-terminal voltage of the first capacitor 3 is maintained within a certain range after an elapse of a predetermined time from the time t4. Here, at a time t5, the control unit 21 receives a discharge instruction signal from the external ECU 13, but it has already executed the discharge control.

At a time t6, the control unit 21 fixes the switching element T2 in the off state and fixes the switching element T1 in an on state. As a result, power of the second capacitor 5 is discharged while the inter-terminal voltage of the first capacitor 3 and the inter-terminal voltage of the second capacitor 5 are maintained at the same value.

The control unit 21 monitors the inter-terminal voltage value Vc2 measured by the second voltage sensor 7 at certain intervals during the discharge control. The control unit 21 may also stop the discharge control when the inter-terminal voltage value Vc2 drops to a target value Vp. In addition, the control unit 21 may also stop the discharge control when the discharge instruction signal from the external ECU 13 has disappeared.

Figure 3:
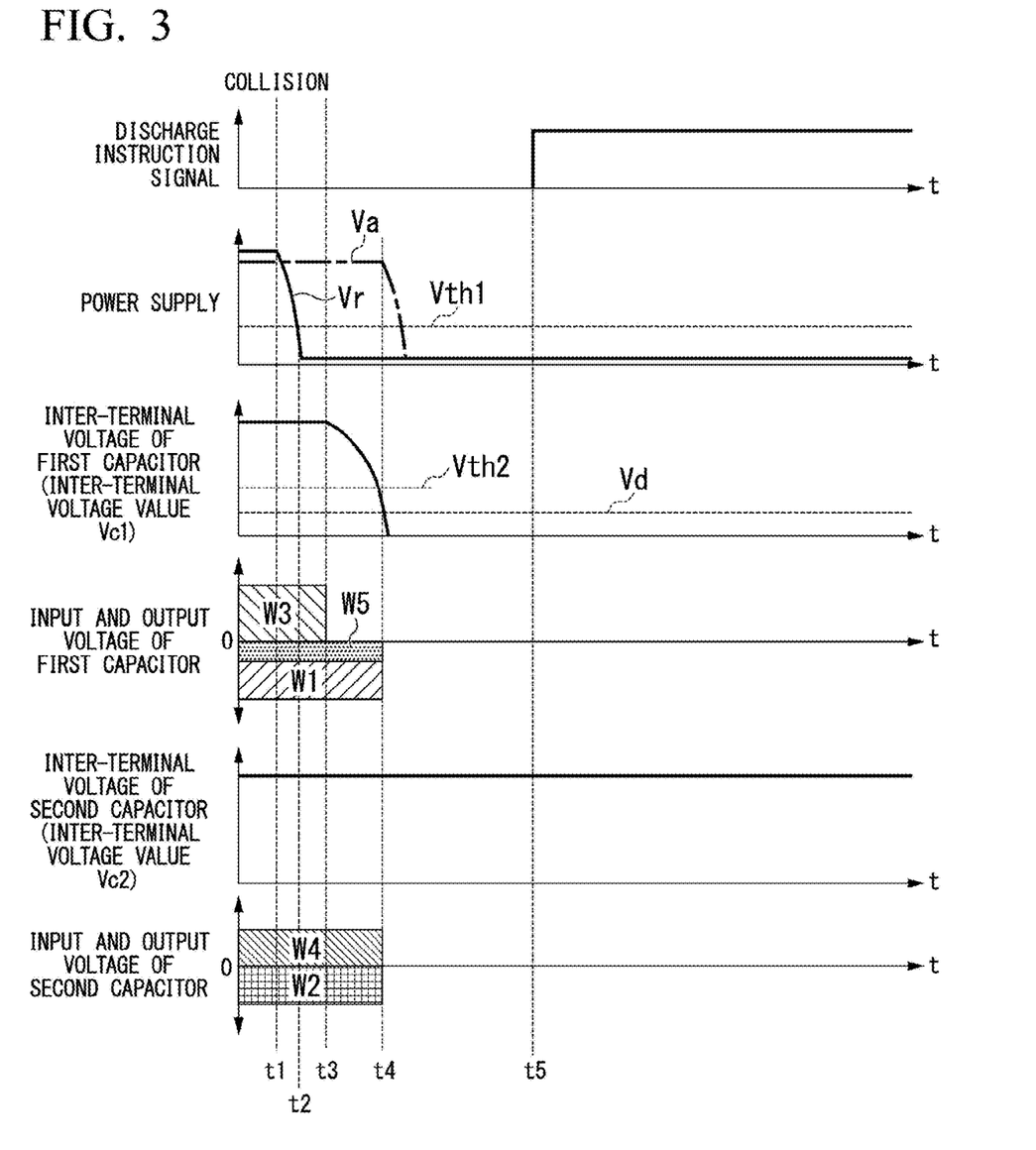
FIG. 3 is a timing chart of a conventional power conversion device that discharges a second capacitor 5 by a motor ECU 14 receiving a discharge instruction signal from an external ECU 13.

Next, effects of the present embodiment will be described using FIG. 3. FIG. 3 is a timing chart of a conventional power conversion device in which the motor ECU 14 discharges the second capacitor 5 by receiving a discharge instruction signal from the external ECU 13.

As shown in FIG. 3, the conventional power conversion device sets the contactor 2 to be in an open state at the time t3 that is a predetermined time after the time t1 when an abnormality has occurred on the power supply line L due to the collision of a vehicle at the time t1. As a result, a supply of power from the battery BT to the conventional power conversion device is stopped. Therefore, since the power W5 is supplied from the first capacitor 3 to the auxiliary device AU, the inter-terminal voltage of the first capacitor 3 sharply decreases from the time t3. At the time t4, the inter-terminal voltage of the first capacitor 3 is equal to or lower than the second threshold value Vth2, and becomes equal to or lower than a lower limit value Vd at which the backup power supply can operate. As a result, the backup power supply 11 cannot generate a control voltage and cannot supply power to the motor ECU 14. Therefore, the motor ECU 14 stops operating due to a loss of operation power, and the conventional power conversion device cannot discharge electric charges from the second capacitor 5.

On the other hand, the power conversion device 1 according to the present embodiment immediately starts the discharge control if a condition that the control voltage value Vr is equal to or lower than the first threshold value Vth1 and the inter-terminal voltage value Vc1 is equal to or lower than the second threshold value Vth2 is satisfied without receiving the discharge instruction signal from the external ECU 13 at a timing of starting the discharge control. As a result, the power conversion device 1 can suppress the inter-terminal voltage of the first capacitor 3 from being equal to or lower than the second threshold value Vth2 and cause a supply of power from the backup power supply 11 to the motor ECU 14 to continue even when there is the collision of the vehicle A and the power supply line L is disconnected. Therefore, the power conversion device 1 can reliably execute the discharge control of the second capacitor 5 when the auxiliary device AU is connected between the battery BT and the step-up/down converter 4.

As described above, one embodiment of the present invention has been described in detail with reference to the drawings, but a specific configuration is not limited to this embodiment, and includes designs within a range not departing from the gist of the present invention. For example, modified examples 1 to 4 as follows can be adopted.

(Modified example 1) In the discharge control of the embodiment described above, the control unit 21 may fix the switching element T2 to be in the off state, and may control switching of the switching element T1 at a predetermined duty ratio such that the current value IL flowing through the reactor L, which is measured by the current sensor 12, is maintained at a target value.

(Modified example 2) The power conversion device 1 according to the embodiment described above may not include the control power supply 9 and the diode 10 in the configuration.

Figure 4:
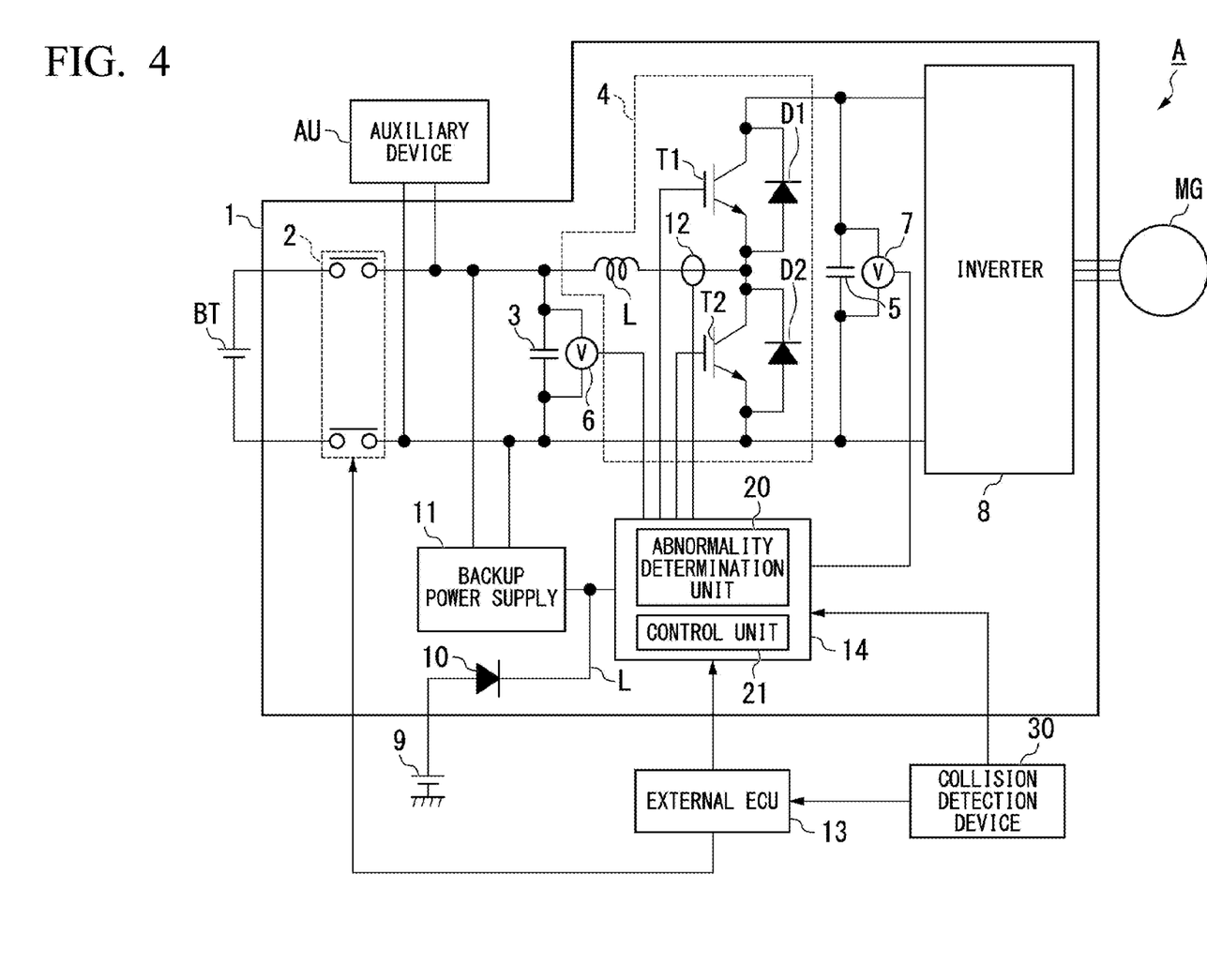
FIG. 4 is a block diagram which shows a configuration of the vehicle A that includes a power conversion device of a modified example of the embodiment described above.

(Modified example 3) The motor ECU 14 of the power conversion device 1 according to the embodiment described above, as shown in FIG. 4, may be connected to the collision detection device (for example, a supplemental restraint system) 30. The collision detection device 30 outputs a collision detection signal to the external ECU 13 and the motor ECU 14 when the collision of the vehicle A is detected. The motor ECU 14 may also execute the discharge control described in the above embodiment when the collision detection signal is received from the collision detection device. That is, the control unit 21 of the modified example 3 may execute the discharge control when any one of a first condition that the collision detection device 30 has detected the collision of the vehicle A and a second condition that it is determined by the abnormality determination unit 20 that an abnormality has occurred and the inter-terminal voltage value Vc1 is equal to or lower than the second threshold value Vth2 has been satisfied. Note that the power conversion device 1 of the modified example 3 may or may not include the collision detection device 30 as long as it can receive a collision detection signal from the collision detection device 30.

(Modified example 4) the abnormality determination unit 20 described above may stop the discharge control when the control voltage value has been higher than the first threshold value Vth1 for a predetermined time during the discharge control.

As described above, the motor ECU 14 according to the present embodiment causes the first capacitor 3 to discharge power of the second capacitor 5 when the control voltage is equal to or lower than the first threshold value Vth1 and the inter-terminal voltage of the first capacitor 3 measured by the first voltage sensor 6 is equal to or lower than the second threshold value Vth2.

According to such a configuration, when the auxiliary device AU is connected between the battery BT and the step-up/down converter 4, it is possible to execute the discharge control of the second capacitor 5.

Note that all or a part of the motor ECU 14 described above may also be realized by a computer. In this case, the computer may include a processor such as a CPU and a graphics processing unit (GPU), and a computer-readable recording medium. Then, a program for realizing all or a part of functions of the motor ECU 14 using a computer is recorded in the computer-readable recording medium, and the program recorded in the recording medium may be realized by causing the processor to read and execute it. Here, the "computer-readable recording medium" refers to a portable medium such as a flexible disk, a magneto-optical disc, a ROM, or a CD-ROM, a storage device such as a hard disk embedded in a computer system. Furthermore, the "computer-readable recording medium" may include a medium that dynamically holds a program for a short time, like a communication line in the case of transmitting the program via a network such as the Internet or a communication line such as a telephone line, and a medium that holds the program for a certain period of time, like a volatile memory inside the computer system that serves as a server or a client in this case. In addition, the program may be a program for realizing a part of the functions described above, or furthermore, may be a program that can realize the functions described above in combination with a program already recorded in the computer system, and may be a program realized by using a programmable logic device such as a field programmable gate array (FPGA).

According to the present invention, when the auxiliary device is connected between the battery and the step-up/down converter, it is possible to execute the discharge control of the smoothing capacitor (the second capacitor). Therefore, there is high industrial applicability.

EXPLANATION OF REFERENCES

1 Power conversion device
3 First capacitor
4 Step-up/down converter
5 Second capacitor
6 First voltage sensor
9 Control power supply (Second DC power supply)
11 Backup power supply
14 Motor ECU (Control device)
20 Abnormality determination unit
21 Control unit
BT Battery (First DC power supply)

What is claimed is:

1. A power conversion device of a vehicle that includes an electric motor, a first DC power supply, a second DC power supply, and an auxiliary device, the power conversion device comprising:
    an inverter configured to drive the electric motor;
    a step-up/down converter configured to perform a step-up operation of stepping up power from the first DC power supply to supply the power to the inverter, and a step-down operation of stepping down power from the inverter to supply the power to the first DC power supply;
    a first capacitor that is provided between the first DC power supply and the step-up/down converter;
    a second capacitor that is provided between the step-up/down converter and the inverter;
    a voltage sensor configured to measure an inter-terminal voltage of the first capacitor;
    a control device configured to execute discharge control for discharging residual charge of the second capacitor using a control voltage supplied from the second DC power supply as an operation source; and
    a backup power supply configured to supply power stored in the first capacitor to the control device,
    wherein the auxiliary device is connected between the first DC power supply and the step-up/down converter, and
    the control device includes:
    an abnormality determination unit configured to determine that an abnormality has occurred when the control voltage is equal to or lower than a first threshold value, and
    a control unit configured to execute the discharge control using a control voltage supplied from the backup power supply as an operation source when the abnormality determination unit determines that an abnormality has occurred and the inter-terminal voltage measured by the voltage sensor is equal to or lower than a second threshold value.

2. The power conversion device according to claim 1, wherein the control unit is configured to stop the discharge control when the control voltage has been higher than the first threshold value for a predetermined time during the discharge control.

3. The power conversion device according to claim 2, wherein the step-up/down converter includes
    an upper arm and a lower arm that are switching elements, and a reactor that has a first end and a second end, in which the first end is connected to a first capacitor and the second end is connected between the upper arm and the lower arm, wherein the control unit is configured to fix the lower arm in an off state and control switching of the upper arm at a predetermined duty ratio as the discharge control.

4. The power conversion device according to claim 1, further comprising:

a collision detection device configured to detect a collision of the vehicle and output a collision detection signal to the control unit, wherein the control unit is configured to execute the discharge control when the collision detection signal is received.

5. The power conversion device according to claim 2, further comprising:

a collision detection device configured to detect a collision of the vehicle and output a collision detection signal to the control unit, wherein the control unit is configured to execute the discharge control when the collision detection signal is received.

6. The power conversion device according to claim 3, further comprising:

a collision detection device configured to detect a collision of the vehicle and output a collision detection signal to the control unit, wherein the control unit is configured to execute the discharge control when the collision detection signal is received.

* * * * *